United States Patent [19]
Amin

[11] 3,852,493
[45] Dec. 3, 1974

[54] PROCESS FOR DEFLUORINATION OF PHOSPHATE ROCK

[75] Inventor: Ashok Babubhai Amin, Trenton, N.J.

[73] Assignee: American Cyanamid Company, Stamford, Conn.

[22] Filed: Aug. 10, 1972

[21] Appl. No.: 279,586

[52] U.S. Cl............ 426/381, 71/45, 71/46, 71/47, 426/74
[51] Int. Cl............................ C05b 13/00
[58] Field of Search ........... 71/46, 47, 41, 45; 426/381, 74

[56] References Cited
UNITED STATES PATENTS

| | | | |
|---|---|---|---|
| 2,839,361 | 6/1958 | Hollingsworth et al. | 71/46 X |
| 2,839,377 | 6/1958 | Hollingsworth et al. | 71/45 |
| 2,945,754 | 7/1960 | Hignett et al. | 71/64 DA X |
| 2,995,436 | 8/1961 | Hollingsworth et al. | 71/45 X |
| 2,995,437 | 8/1961 | Hollingsworth | 71/46 |
| 3,032,408 | 5/1962 | Baumann | 71/64 DA |
| 3,189,433 | 6/1965 | Hollingsworth et al. | 71/64 DA |
| 3,364,008 | 1/1968 | Hollingsworth | 71/41 |

Primary Examiner—Samih N. Zaharna
Assistant Examiner—Richard Barnes
Attorney, Agent, or Firm—H. G. Jackson

[57] ABSTRACT

The invention is a process for the manufacture of highly citrate soluble phosphatic materials containing at least 18% P and not more than 0.18% F and involves the thermal defluorination of phosphate rock analyzing between 68 and 74 BPL (BPL = % bone phosphate of lime or $Ca_3(PO_4)_2$ equivalent to $P_2O_5$ content of the rock). Such phosphate materials are used as animal feed additives.

7 Claims, 1 Drawing Figure

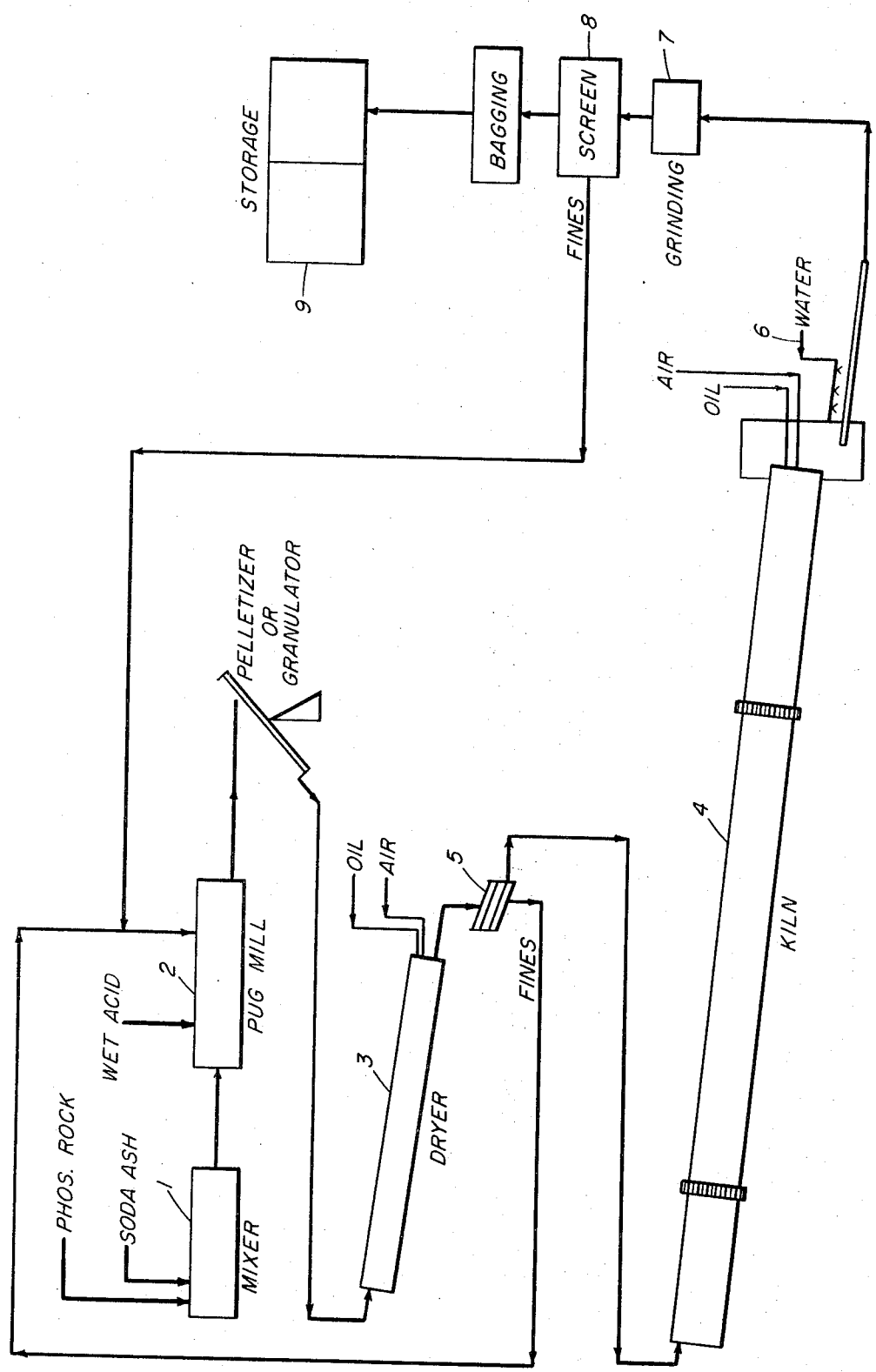

PROCESS FOR DEFLUORINATION OF PHOSPHATE ROCK

BACKGROUND OF THE INVENTION

1. Field of the Invention

The invention pertains to defluorinating phosphate rock.

2. Description of the Prior Art

Two well known techniques for defluorination of phosphate rock are those of C. A. Hollingsworth's U.S. Pat. No. 2,995,437 (1961) and C. A. Hollingsworth et al.'s U.S. Pat. No. 2,995,436 (1961).

The processes described in the patents deal with defluorinating high grade phosphate rock, i.e., rock analyzing over 75 BPL (BPL = % bone phosphate of lime or $Ca_3(PO_4)_2$ equivalent to $P_2O_5$ content of the rock). Rock of this analysis is becoming scarce in the United States and rock now sold from the Florida fields, the primary source of phosphate rock in the United States, is 74/73 BPL, analyzing 33.4 to 33.8% $P_2O_5$, 47.5% to 48.5% CaO and 3 to 4% $SiO_2$. While the use of 74/73 BPL rock appears to be a minor deviation from past practices, such change is, in fact, a significant change, for when the processes of Hollingsworth are applied to low-grade phosphate rock, the products obtained do not contain 18 percent phosphorus as required by the market. Furthermore, for best availability of phosphorus to animals, it is desirable to maximize the percentage of citrate-soluble phosphorus in the products; however, products prepared from low-grade rock utilizing the processes of Hollingsworth are characterized by a relatively high (7.0 to 15.0 percent) citrate insoluble $P_2O_5$. My process provides a process for manufacturing a highly citrate-soluble phosphate containing at least 18 percent phosphorus using 68–74 BPL phosphate rock. The rate of defluorination of phosphate rock is increased in my process. And fusion of materials being processed is inhibited in my process. Inhibiting fusion is particularly important for phosphate products and no entirely satisfactory process has been found which entirely eliminates fusion of material being thermally defluorinated. In the past, fusion of materials being processed generally occurs in processes for defluorination of phosphatic materials. Fusion is evident from the formation of glassy deposits around the circumference of the kiln, and formation of microscopic glassy or polycrystalline spheres in the product.

SUMMARY OF THE INVENTION

The invention relates to a method for the manufacture of phosphatic materials containing at least 18% P and not more than 0.18% F, comprising;

A. mixing 68–74 BPL phosphate rock, containing 2–6% $SiO_2$, with water, wet process phosphoric acid and soda ash in sufficient amounts to provide about 3.5 to 6 parts of $Na_2O$ and about 9 to 15.5 parts of $P_2O_5$ from the added reagent, per 100 parts of rock, the added components having a $Na_2O/P_2O_5$ mole ratio of between 0.70 and 0.95;

B. granulating the mixture with recycled fines from a later calcination step;

C. drying the granules and separating fines therefrom;

D. calcining the dried granules at a maximum temperature between about 1,315°C. and 1,540°C. in an atmosphere containing about 5 to 30 percent of water vapour;

E. quenching the calcined granules to a temperature less than 800°C.;

F. crushing and screening the quenched granules to separate fines from product, and G. recycling the fines to the granulating step.

DESCRIPTION OF THE DRAWING

FIG. 1 is a diagram of the steps for a defluorination process. Phosphate rock and soda ash are blended together in a mixer 1 and the blended mixture is transported to a pug mill 2. After passing through the dryer 3 and screen 5 calcined fines are recycled to the pug mill 2. Product from the screening operation is sent to the kiln 4.

PREFERRED EMBODIMENTS

Phosphate rock and soda ash are blended together in a mixer 1 and the blended mixture is transported to a pug mill 2 where it is admixed with wet process phosphoric acid. In practice, the phosphate rock utilized in the process of the present invention analyzes 68 to 74 percent BPL and contains an undesirable amount of fluorine and 2 to 6 percent by weight $SiO_2$. To operate effectively, the process requires that for each 100 parts of rock, there is added enough soda ash to provide 3.5 to 6 parts of $Na_2O$ and enough wet process phosphoric acid to provide 9 to 15.5 parts of $P_2O_5$. It has also been found that the $Na_2O/P_2O_5$ mole ratio of the added soda ash and wet process phosphoric acid must range between 0.70 and 0.95 if effective defluorination of the rock is to be achieved without fusion. Enough water may also be added to the mixture to assure a uniform pasty consistency exiting the pug mill 2.

Alternative sequences of component addition include (A) reaction of soda ash with wet process phosphoric acid to prepare a solution of sodium phosphate in the wet process acid, followed by addition of the thus formed solution to the phosphate rock, and (B) simultaneous introduction of soda ash, phosphate rock and wet process phosphoric acid into the pug mill 2. Water may be added as needed in either of the latter systems.

While it is evident that the order of addition of the components is not critical, it will be seen that the ratio of soda ash and wet process phosphoric acid to phosphate rock and the ratio of $Na_2O$ to $P_2O_5$ in the added components are essential for the effective treatment of 68 to 74% BPL phosphate rock.

It can be seen from FIG. 1 that calcined fines from the kiln 4 are recycled to the pug mill 2 and admixed with the pasty reaction mixture formed therein. In operation, I have found it desirable to add approximately 6 to 30 percent by weight, and preferably 6 to 15 percent by weight, of calcined fines to the reaction mixture before it is pelletized or granulated. A preferred method of accomplishing such admixture is to introduce the calcined fines into the reaction mixture just prior to its exiting the pug mill 2. The term "fines" as used herein is intended to mean —60 mesh particles. Addition of from 6 to 30 percent by weight of fines to the reaction mixture is essential to the process of this invention since it improves the granulation, raises the melting point of the mixture, increases the rate of defluorination thereof and eliminates or inhibits fusion of the product in the kiln.

Alternatively, the reaction mixture can be introduced into a separate mixer or blender and there mixed with calcined fines. The thus formed mixture is then granulated or pelletized using any convenient or conventional granulating or pelletizing equipment. In the preferred process the mass median diameter of the granules formed is between about one-eighth and one-half inch in diameter.

The granulated or pelletized product is then dried, preferably in an oil fired dryer 3, at a temperature not exceeding about 315°C.

In practice I have also found that the temperature at which the granulated reaction mixture is dried is extremely important. When ground rock, comprising 90 percent or more minus 100 mesh particles, at least 60 percent of which is minus 200 mesh size, is treated with soda and wet process phosphoric acid according to the process of the invention and then pelletized or granulated, the granulated product can be dried at a temperature between 66°C. and 315°C. However, when unground rock is employed in the same process, drying of the granulated product must be carried out at a temperature between about 100°C. and 315°C. The term "unground rock" means phosphate rock of a particle size at least 75 percent of which passes through a 14 mesh screen and is retained on a 60 mesh screen. Moreover, I have found that the addition of as little as 10 percent of unground rock to ground rock treated in accordance with the process of the present invention necessitates drying the granulated product at a temperature between 100°C. and 315°C.

If drying is inadequate the granulated product, when calcined, may lose its shape, swell or fuse, thus rendering the final product and process operation unacceptable.

The product from the drier 3 is then screened through screen 5 and the fines separated by the screening recycled along with calcined fines to the pug mill 2 for incorporation with the reaction mixture. The product from the screening operation is sent to the kiln 4 or fluid bed reactor for calcining at a temperature between 1,315°C. and 1,540°C.

Calcining is preferably carried out in a direct fired calciner, the atmosphere of which contains about 5 to 30 percent by volume and preferably 5 to 15 percent by volume water vapor. Calcining is usually accomplished in about 10 to 60 minutes and preferably 10 to 30 minutes under the conditions specified. Either a rotary or fluid bed calciner may be used.

The calcined product is then cooled, preferably by quenching with water 6, to a temperature not greater than about 800°C. The quenched product is then crushed or ground 7 to the desired product size. The crushed product is screened, fines (e.g., −60 mesh particles) are separated therefrom and recycled to the pug mill 2 for admixture as previously described, with the reaction mixture produced by reaction of the soda ash, wet process phosphoric acid and 68 to 74% BPL phosphate rock. Product from the screen may be bagged and sent to storage 9 as indicated in FIG. 1 or it may be sent to bulk storage directly.

The product is generally 90 to 100 percent −14 mesh material containing 50 to 95 percent +100 mesh material, at least 18 percent phosphorous and not more than 0.18 percent fluorine.

EXAMPLE 1

In the following tests, wet process phosphoric acid is reacted with soda ash to prepare a solution of sodium phosphate in wet process acid. The $Na_2O/P_2O_5$ mole ratio of the acid solution is varied from 0.68 to 1.33 and the appropriate solution admixed with ground phosphate rock having a particle size such that at least 90 percent thereof passes through a 100 mesh screen and about 60 percent passes through a 200 mesh screen. The pasty mixture is granulated and then dried at a temperature between 66°C. and 315°C. The dry granules are then calcined in the temperature range of 650°–1,540°C. for a period of 60 to 120 minutes in an atmosphere of gas containing at least 5% $H_2O$. The calcined material is quenched with water, dried and ground. The products are analyzed for total $P_2O_5$, citrate insoluble $P_2O_5$ and fluorine, and the data obtained are given below along with more comprehensive analyses of rock and acid.

Analyses

Phosphate Rock (73.5 BPL)

| % $P_2O_5$ | % $SiO_2$ | % CaO | % $Fe_2O_3$ | % $Al_2O_3$ | % F |
|---|---|---|---|---|---|
| 33.6 | 3.2 | 49.54 | 1.22 | 0.56 | 3.9 |

Rock as low-grade as 68 BPL may be used.

Wet Process Phosphoric Acid

| % $P_2O_5$ | % $Fe_2O_3$ | % $Al_2O_3$ | % F | % CaO |
|---|---|---|---|---|
| 53.5 | 1.2 | 1.1 | 0.6 | 0.25 |

The results of calcining runs are presented in Table I.

Test Formulations

| A | B |
|---|---|
| 100 parts ground rock 73.5 BPL | 100 parts ground rock 73.5 BPL |
| 12.2 parts $P_2O_5$ from wet acid of 53.5% $P_2O_5$ | 7.42 parts $P_2O_5$ from wet acid of 53.5% $P_2O_5$ |
| 7.0 parts light soda ash | 7 parts light soda ash |

Granules are dried and then calcined as follows in an atmosphere containing steam.

Table I

| | Calcining | | |
|---|---|---|---|
| Time, min. | Temp., °C. | % F in A | % F in B |
| 0 | 674 | | |
| 35 | 982 | 3.3 | 3.88 |
| 65 | 1121 | 3.2 | 3.53 |
| 105 | 1271 | 1.62 | 2.17 |
| 135 | 1371 | 0.54 | 1.55 |

Table I — Continued

| Time, min. | Calcining Temp., °C. | % F in A | % F in B |
|---|---|---|---|
| 155 | 1421 | 0.05 | 0.99 |
| 165 | 1421 | 0.044 | 0.65 |
| 175 | 1421 | 0.03 | 0.4 |
|  |  | % P in product=18.56 % Cl $P_2O_5$=3.12 $Na_2O/P_2O_5$ mole ratio in added components=0.77 | % P in product=17.83 % Cl $P_2O_5$=7.39 $Na_2O/P_2O_5$ mole ratio in added components=1.25 |

These data show that with 74/73 BPL rock treated in accordance with the process of the invention, the rate of defluorination of the reaction mixture is improved. They also show that the product of the process of the invention contains more than 18 percent P and has a very low $P_2O_5$ citrate insolubility; whereas, the same rock treated in accordance with previously available procedures yields a product which has a high $P_2O_5$ citrate insolubility and does not meet the required 18% P.

EXAMPLE 2

The procedure set forth in Example 1 is employed in the following tests excepting that the $Na_2O/P_2O_5$ mole ratio in the added components is varied. The rock used is 74/73 BPL and is ground.

From the data obtained and reported in Table II, it can be seen that when low grade rock (74/73 BPL) is employed, the $Na_2O/P_2O_5$ mole ratio in the added components must be 0.70 to 0.95 if a satisfactory product is to be obtained.

EXAMPLE 3

The procedure of Example 1 was repeated using low grade rock (74/73 BPL), excepting that in particular tests unground rock was substituted for ground rock, and mixtures of ground and unground rock were also used. The $Na_2O/P_2O_5$ mole ratio used was 0.77 or 1.25 and drying of the granulated reaction mixture was carried out at various temperatures.

Data obtained are reported in Table III where the importance of the drying temperature, as it relates to granular stability, is seen.

The data also establish the significance of the ratio of phosphate rock to wet process phosphoric acid and soda ash; and the $N_2O/P_2O_5$ ratio in the added components.

In order to investigate the heat stability of the above prepared granules, samples were put in a furnace at 650°C. for 10 minutes. The samples were then taken out and examined. Those samples which retained their granule shape were then defluorinated by calcining in a steam-containing atmosphere.

TABLE II

| No. | Weight % of the $Na_2O$ Added Based on Weight of Rock | Weight % of Acid $P_2O_5$ Added Based on Weight of Rock | $Na_2O/P_2O_5$ Mole Ratio in Added Components | P/F Weight Ratio in Product | Total % $P_2O_5$ in Product | % Citrate Insoluble $P_2O_5$ in the Product | Remarks |
|---|---|---|---|---|---|---|---|
| 1 | 3.51 | 10.7 | 0.75 | >100 | 42.6 | 6.1 | |
| 2 | 3.51 | 11.77 | 0.68 | >100 | 43.0 | 10.6 | unsatisfactory product - Cl $P_2O_5$ too high |
| 3 | 4.09 | 8.02 | 1.17 | <100 | 39.8 | 15.2 | unsatisfactory product - not defluorinated |
| 4 | 4.09 | 8.56 | 1.09 | <100 | 40.2 | 7.6 | unsatisfactory product - not defluorinated |
| 5 | 4.09 | 10.70 | 0.87 | >100 | 41.6 | 2.5 | 2% $SiO_2$ added to the rock |
| 6 | 4.09 | 11.23 | 0.836 | >100 | 42.4 | 2.4 | |
| 7 | 4.09 | 13.37 | 0.702 | >100 | 43.1 | 3.3 | |
| 8 | 4.09 | 12.30 | 0.763 | >100 | 42.76 | 5.4 | |
| 9 | 4.67 | 8.02 | 1.33 | >100 | 39.6 | 14.5 | unsatisfactory product - total $P_2O_5$ too low, Cl $P_2O_5$ too high |
| 10 | 4.67 | 11.77 | 0.91 | >100 | 41.9 | 0.46 | 2% $SiO_2$ added to the rock |
| 11 | 4.67 | 12.80 | 0.836 | >100 | 42.74 | 5.4 | |
| 12 | 5.26 | 13.37 | 0.90 | >100 | 42.2 | 0.32 | |
| 13 | 5.26 | 13.37 | 0.90 | >100 | 42.0 | 0.55 | 2% $SiO_2$ added to the rock |
| 14 | 5.26 | 13.91 | 0.868 | >100 | 43.0 | 2.50 | |
| 15 | 5.85 | 13.91 | 0.964 | >100 | 42.8 | 11.40 | unsatisfactory product - Cl $P_2O_5$ too high |
| 16 | 5.85 | 14.44 | 0.93 | >100 | 42.5 | 6.26 | 2% $SiO_2$ added to the rock |
| 17 | 5.85 | 15.5 | 0.86 | >100 | 43.5 | 6.1 | |

TABLE III

| Formulation tested | Granule Stability Na₂O/P₂O₅ mole ratio of added soda-ash and acid | Drying temperature |
|---|---|---|
| I 100 parts ground rock 7.42 parts P₂O₅ from wet acid 7 parts Na₂CO₃ | 1.25 | dried at 210°C. |
| II Same as I | 1.25 | dried at 100°C. |
| III Same as I except unground rock was used | 1.25 | dried at 210°C. |
| IV 100 parts ground rock 12.2 parts P₂O₅ from wet acid 7 parts soda ash | 0.77 | dried at 80°C. |
| V Same as IV except unground rock was used and 7 parts of a previously defluorinated ground product was added before granulation and drying | 0.77 | dried at 210°C. |
| VI Same as V | 0.77 | dried at 100°C. |
| VII 75 parts unground rock 25 parts ground rock 12.2 parts P₂O₅ from wet acid 7 parts Na₂CO₃ | 0.77 | dried at 210°C. |
| VIII 90 parts ground rock 10 parts unground rock 12.2 parts P₂O₅ from wet acid 7 parts Na₂CO₃ | 0.77 | dried at 100°C. |

Stability Test

| No. | Observations |
|---|---|
| I | granules fused together and completely lost their shape |
| II | granules were completely fused and lost their shape |
| III | granules retained their shape but were fused together |
| IV | slightly fused together but did not lose shape |
| V | granules did not fuse together and retained their shape |
| VI | granules fused together but retained their shape |
| VII | granules swelled a little but did not fuse and retained their shape |
| VIII | granules fused, swollen and lost their shape |

Samples II, IV, V and VII, which retained their shape in the stability test, were defluorinated as follows.

| Time, min. | Temp., °C. | Remark |
|---|---|---|
| 0 | 674 | samples put in furnace |
| 40 | 1002 | |
| 90 | 1288 | |
| 110 | 1385 | samples taken out of furnace and quenched in water |

| No. | Na₂O/P₂O₅ mole ratio | % F | % Cl P | % Total P |
|---|---|---|---|---|
| III | 1.25 | 0.9 | 5.14 | 17.43 |
| IV | 0.77 | 0.032 | 0.88 | 18.55 |
| V | 0.77 | 0.04 | 0.82 | 18.59 |
| VII | 0.77 | 0.023 | 0.70 | 18.51 |

I claim:

1. A process for manufacturing phosphatic materials containing at least 18% P and not more than 0.18% F, comprising:
   mixing 68–74% BPL phosphate rock, containing 2–6% $SiO_2$, with water, wet process phosphoric acid and soda ash in sufficient amounts to provide 3.5 to 6 parts by weight of $Na_2O$ and 9 to 15.5 parts by weight of $P_2O_5$ in the added components per 100 parts by weight of rock and further to provide a $Na_2O/P_2O_5$ mole ratio in the added components of between 0.70 and 0.95;
   granulating said mixture with recycled fines from a later calcination step;
   drying said granules and separating fines therefrom;
   calcining said dried granules, from which fines have been removed, at a temperature between about 1,315°C. and 1,540°C. in an atmosphere containing about 5 to 30 percent of water vapor;
   quenching said calcined granules to a temperature less than 800°C;
   crushing and screening said quenched granules;
   recycling from about 6 to 30 percent by weight of the fine particles from said crushing and screening step to the granulating step; and
   recovering the product from said screening step.

2. A process according to claim 1 wherein the phosphate rock has a particle size such that at least 90 percent by weight of said rock passes through a 100 mesh screen, and the granulated reaction mixture is dried at a temperature between 66°C. and 315°C.

3. A process according to claim 1 wherein at least 10 percent by weight of the phosphate rock has a particle size such that it passes through a 14 mesh screen and is retained on a 60 mesh screen, and the granulated reaction mixture is dried at a temperature between about 210°C. and 315°C.

4. A process according to claim 2 wherein from about 6 to 15 percent by weight of the calcined fines are added to the granulated reaction mixture.

5. A process according to claim 2 wherein the calcining atmosphere contains about 5 to 20 percent by volume water vapor.

6. A process according to claim 3 wherein from about 6 to 15 percent by weight of the calcined product is added to the granulated reaction mixture.

7. A process according to claim 3 wherein the calcining atmosphere contains 5 to 20 percent by volume water vapor.

* * * * *